United States Patent [19]

Kim

[11] Patent Number: 4,983,247
[45] Date of Patent: Jan. 8, 1991

[54] METHOD FOR PRODUCING RESIN RICH SURFACE LAYER ON COMPOSITE THERMOPLASTIC MATERIAL

[75] Inventor: Bang M. Kim, Schenectady, N.Y.

[73] Assignee: General Electric Company, Schenectady, N.Y.

[21] Appl. No.: 390,148

[22] Filed: Aug. 7, 1989

[51] Int. Cl.⁵ ............................................. B32B 31/00
[52] U.S. Cl. .................... 156/272.2; 156/282; 156/309.6; 264/255; 264/257; 264/322; 264/324
[58] Field of Search ............. 156/232, 282, 309.6, 156/62.2, 272.2; 264/322, 324, 119, 125, 73, 74, 250, 255, 257; 249/80, 111

[56] References Cited

U.S. PATENT DOCUMENTS

| | | | |
|---|---|---|---|
| 2,417,510 | 3/1947 | McGinnis | 264/324 X |
| 2,577,205 | 12/1951 | Meyer et al. | 156/232 X |
| 3,765,998 | 10/1973 | Oswald et al. | 264/324 X |
| 3,790,417 | 2/1974 | Paterson et al. | 156/62.8 |
| 4,035,215 | 7/1977 | Goldstone | 156/245 |
| 4,201,612 | 5/1980 | Figge et al. | 156/222 X |
| 4,274,857 | 6/1981 | Wolfe | 65/273 X |
| 4,504,347 | 3/1985 | Munk et al. | 156/62.6 X |
| 4,504,530 | 3/1985 | Bliley | 428/35 |
| 4,716,072 | 12/1987 | Kim | 428/212 |
| 4,838,974 | 6/1989 | Nied et al. | 156/222 |

*Primary Examiner*—Michael W. Ball
*Assistant Examiner*—Mark A. Osole
*Attorney, Agent, or Firm*—Patrick R. Scanlon; James C. Davis, Jr.; Paul R. Webb, II

[57] ABSTRACT

A layer of a neat resin in powder form is deposited either on a mold surface or on a bulk thermoplastic composite fiber reinforced sheet. The resin layer is adjacent to an insulated wall of a compression mold. The bulk sheet is preheated and compression deformed with the powdered resin. The heat from the sheet flows to and melts the powder layer producing a resin rich layer. The insulated wall permits the heat of the sheet to be retained sufficiently to melt the powdered resin. In the alternative, the neat resin powder may be replaced with a preformed film of thermoplastic resin compatible with the sheet resin. A structural homogeneous integral molecular bond is formed between the neat resin layer and the sheet.

16 Claims, 3 Drawing Sheets

METHOD FOR PRODUCING RESIN RICH SURFACE LAYER ON COMPOSITE THERMOPLASTIC MATERIAL

The present invention relates to providing a resin rich surface layer on molded composite thermoplastics.

Of interest are copending applications Ser. No. 07/435,639 entitled, "Multilayer Composite Mold Structure for Molding on Hot Surfaces" in the name of B. M. Kim which is a continuation of Ser. No. 07/175,078 now abandoned, Ser. No. 07/135,762 entitled "Reinforced Composite and Method of Manufacture" in the name of Kim et al now U.S. Pat. No. 4,859,524, Ser. No. 07/435,640 entitled "Apparatus for Blow Molding Parts with Smooth Surfaces", in the name of B. M. Kim which is a continuation of Ser. No. 07/250,806, now abandoned, Ser. No. 07/361,464 entitled "Compression Molding of Composite Parts on Hot Mold Surfaces with a Short Cycle Time" in the name of B. M. Kim which is a continuation of Ser. No. 07/176,114, now abandoned, Ser. No. 07/380,353 entitled "Apparatus and Method for Deforming Thermoplastic Material Using RF Heating", in the name of Konrad et al., Ser No. 07/486,491 entitled "Method and Apparatus for Molding Plastics on Hot Surfaces Using Dielectric Heating", in the name of Kim which is a continuation of Ser. No. 07/253,513, now abandoned, Ser. No. 379,760 entitled, "Apparatus and Method for Deforming Thermoplastic Material Using RF Heating", in the name of Choi et al., and Ser. No. 07/486,345 entitled "Method and Apparatus for Molding Plastics on Hot Surfaces Using Induction Heating" in the name of B. M. Kim and U.S. Pat. No. 4,716,072 in the name of B. M. Kim, all of the above being assigned to the General Electric Company.

The use of glass reinforced thermoplastic sheets is a promising method for producing relatively thin, wide and strong parts such as car hoods, doors and panels. One important prerequisite for the use of glass reinforced composite products in automobile applications is a Class A surface. While there is no universally accepted specification, the Class A surface is a glossy, smooth and polished surface which should be as smooth as that of current automobile exterior parts made from sheet metal.

Current molding processes of glass reinforced thermoplastic composite sheets begins with heating the composite blanks. The blanks may be heated in an oven, typically in infrared or hot air convection ovens or, in the alternative, as disclosed in copending applications Ser. Nos. 07/486,491, 07/486,345, 07/380,353, and 07/379,760, the blanks may be heated by dielectric heating using radio frequency signals or induction heating. The material is heated above its melting point, if crystalline or, if amorphous, at least substantially above its glass transition temperature. The hot blanks are then pressed between cool mold surfaces (surfaces lower than the melting point or the glass transition temperatures), which are typically in the range of 175°–250° F.

When the composite blanks are heated, hey expand (loft) due to the latent recoil forces within the fibers. The surface of the expanded blanks then cools during its transfer to the mold, resulting in "frozen" resins on the surface. Compression of a blank by the relatively cooler mold produces surfaces which are not completely filled with resins, although some hot molten material moves from the inner core to the surface. This creates unfilled areas in the form of exposed fibers and surface porosity or voids. Since the resin at the cold surface is frozen and does not flow, rough boundaries between charged and newly formed areas are also produced. The exposed fibers, porous areas and blank boundaries are the major manifestations of surface roughness, although other physical processes such as differential thermal shrinkage between fibers and resins, can also result in surface roughness and/or waviness.

As disclosed in aforementioned copending application Ser. No. 07/435,640, smooth surfaces can be obtained from neat resin (pure resin) in blow molding by using hot surface molding. The resin is supplied hot to the mold as a parison in blow molding. A commercial technique, which is based on temperature cycling of mold surfaces using heating and cooling fluids, increases the cycle time of the process and uses relatively complex control schemes. Compression molding of composite sheets is much different from blow molding of neat resins. Heating composite sheets causes the fibers to loft producing exposed fibers at the surfaces. Attempts to obtain smooth surfaces with composite sheets by compression have involved changing the structure of the composite sheets so that the outside layers on the composite sheets have neat resin with a barrier layer provided to prevent the fibers situated in the middle layer from coming to the surface as disclosed in aforementioned U.S. Pat. No. 4,716,072. These sheets are then molded using conventional compression molding techniques. However, the disadvantage of this technique is that the glass fibers have a tendency of moving to the surface during the preheating stage. Once the fibers are exposed to the surface, rough surfaces are obtained.

The present invention is directed to solving the need for a method to produce a resin rich skin on the surface of the part, and thus, a smooth surface on composite thermoplastic material whose fibers tend to loft when the material is heated.

A method of making a fiber reinforced composite component having a resin rich layer at a component surface in accordance with the present invention comprises forming a fiber free layer of a first thermoplastic resin and juxtaposing with the layer at least a portion of a thermoplastic blank comprising a second thermoplastic resin in a fibrous reinforcing material. The second resin comprises material that is compatible with the first resin such that the first and second resins form a structural bond therebetween when softened and compressed together. At least the blank is then heated and softened and the hot softened blank and layer are then compressed together to form the structural bond. In one embodiment, the fiber free layer is heated from the heat conducted from the heated second resin.

IN THE DRAWING

Figure 1:
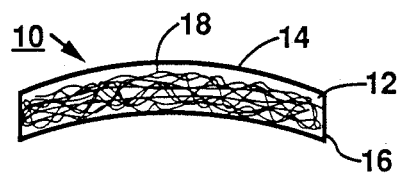
FIG. 1 is an end elevation view of a thermoplastic component formed in accordance with the present invention.

In FIG. 1, component 10 comprises a thermoplastic formed sheet material having a resin rich layer 12 forming surface 14 and a fiber filled thermoplastic body 16 comprising a blank of thermoplastic resin in a fibrous reinforcing material. The layer 12 and body 16 have an integral homogeneous interface 18 such that a structural bond is formed between the layer 12 and the body 16. The structural bond between layer 12 and body 16 is to be differentiated between a bonded joint using an adhesive. The layer 12 is not adheringly attached to the body 16 as would occur with the use of an adhesive but is molecularly attached. That is, the molecules of the thermoplastic of layer 12 co-mingle with the molecules of the body 16 at the interface 18 to form an integral thermoplastic structure. The composite material forming component 10 can comprise, for example, approximately 30–50% glass fiber mat and 50–70% polymer resin. The glass fiber mat can be fabricated from continuous strands sized with the sizing compatible with a matrix resin being used. Depending on the particular implementation, a variety of polymer matrices may be used, such as polycarbonate, polyesters, polypropylene, polyamide, polyimide, polyphenylene oxide, polystyrene, blends of the above and other thermoplastic polymers.

The resin forming layer 12 is the same resin as used in the body 16 or a resin that is compatible with the body 16 so as to form a molecular integral homogeneous interface joint between the two when both the layer and the body are heated and softened above the glass transition temperature of the resins. For a crystalline resin, the material is heated above its melting temperature and for an amorphous resin, the material is heated significantly above the transition temperature to sufficiently soften the layer and body to a point where the molecular bond can be formed.

Figure 2:
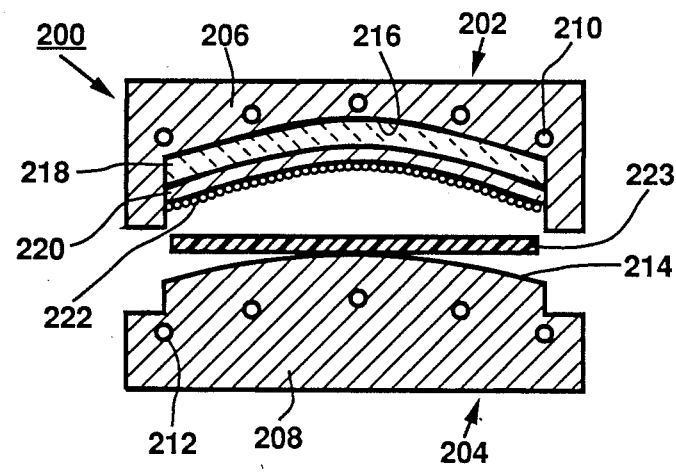
FIG. 2 is a sectional side elevation view of upper and lower mold halves including a composite thermoplastic blank and resin rich layer to produce the component of FIG. 1 in accordance with one embodiment of the present invention.

In FIG. 2, mold 200 comprises an upper mold half 202 and a lower mold half 204. Each mold half 202 and 204 comprises a core 206 and 208, respectively. The cores 206 and 208 are the same material and comprise high thermal conductivity material, for example, metal. Core 206 includes an array of cooling conduits 210 and the core 208 includes an array of cooling conduits 212. The lower core 208 has a contoured mold surface 214. The upper core 206 has a mold surface 216 covered by a thermal insulating layer 218. The thermal insulating layer 218 can be fabricated from a low thermal conductivity material, such as plastics, plastic composites, porous metals, ceramics, low thermal conductivity metal alloys, expanding composites and elastomers. The insulating layer 218, in the alternative, can be fabricated from a compressible material such as felt or thermally stable fibers. Suitable thermally stable fibers includes ceramic, metal, glass and polymers. Other low thermal conductivity materials typically used for insulation having sufficient hardness to serve as a mold member under high pressures may also be used.

Where the insulating layer 218 is not mechanically strong, or, it cannot easily produce surfaces of high quality when used as a mold surface due to the porosity as occurs in porous materials, a hard skin layer 220 may be used which covers the insulating layer 218. The hard skin layer 220 comprises a thin layer of smooth hard metal, ceramic or other relatively hard solid dense material which provides the necessary mechanical strength while imparting a smooth surface to the object being molded. The hard skin layer can be fabricated from iron, carbon steel, stainless steel, nickel, aluminum, brass, copper, ceramics, glass, quartz, plastics and plastic composites. Metal alloys with a low thermal expansion coefficient, such as, Invar, a ferronickel, can also be used. The hard skin layer 220 and insulating layer 218 can be applied, for example, by lamination, deposition or sintering.

The high conductivity core 206 provides good heat transfer to and from the insulating layer 218. The core 206 is cooled by cooling fluid passing through the cooling conduits 210. Cooling fluid passing through the conduits 210 maintain the core 206 (and core 208) at a predetermined equilibrium temperature which is below the melting or glass transition temperature for the thermoplastic material being molded. The material forming core 206 and core 208 can comprise tool steel but other materials such as aluminum can be used in the alternative.

The skin layer 220 and insulation layer 218 can, in the alternative, comprise a single material with different thermal conductivities due to structural differences achieved during fabrication. Using vapor deposition, metallization or electroplating, for example, a dense layer can be created against a form of the desired part for the skin layer 220 while a superimposed porous region can be created to function as the insulation layer 218.

In the alternative to the embodiment illustrated in FIG. 2, the lower core 208 may also be covered with an insulating layer such as layer 218. Further, a hard skin layer such as layer 220 may cover such an insulating layer over the lower core 208 if the surface finish of the component being formed mandates such a hard layer or if the insulating layer (not shown) employed with the lower core 208 does not have sufficient mechanical strength to form the thermoplastic component under the molding pressures employed.

The mold surface 216 of the core 206 has the desired contour of the component being formed as does the layers 218 and 220. The contours of layers 220, 218 and core surface 216 are complimentary to the contour of surface 214 to form the component 10, FIG. 1, having the contour of the mold halves of FIG. 2. The mold halves 202 and 204 may be further constructed as disclosed in aforementioned co-pending applications Ser. Nos. 07/435,639 and 07/361,464.

In accordance with one embodiment of the present invention, a sheet 223 of a thermoplastic composite material is inserted between the mold halves 202 and 204. As disclosed in the aforementioned patent application Ser. No. 07/361,464, a technique is employed for improving the surface characteristics of a composite sheet to deal with the problem of surface roughness. The solution as disclosed includes molding composite parts on hot mold surfaces. Hot surface molding produces a very thin resin rich layer on the surface. However, the differential thermal shrinkage between the glass fibers and the resin may result in some waviness on the surfaces, particularly when the glass fibers are close to the surface. This problem is magnified when the resin is a crystalline or semi-crystalline material. An extra thick layer of resin at the surface, as provided by the method of the present invention would tend to reduce this surface waviness.

Improvement of other properties can be made to the extra thick surface layer by adding fillers such as UV resistant materials or pigments. A need is seen for a resin rich layer on a molten part that is not limited to compression molding composites and is adaptable for injection molding of neat resins or forming materials, blow molding and extrusion. As provided in accordance with one embodiment of the present invention, a layer 222 of a thermoplastic resin in powder form is electrostatically deposited on the surface of the hard skin layer 220. The layer 222 may be of a neat resin or may include fillers such as short fibers for added strength, pigments, UV resistant materials or other materials having negligible effect on the surface characteristics of the layer 222. The kinds of materials that form layer 222 and sheet 223 are disclosed by way of example in addition to materials mentioned above, those mentioned in aforementioned U.S. Pat. No. 4,859,524. It should be understood, however, that if only a portion of the surface of sheet 223 needs to have the improved surface characteristics of layer 222, only that portion of sheet 223 need be included in the area covered by layer 222. Additionally, different portions of layer 222 may be loaded with different fillers to give it different characteristics over different areas of the layer 222. For example, one portion may include one color and other portions may be given different colors, UV resistance and so forth.

The sheet 223 may be loaded with an RF sensor material and heated by RF energy by the well known technique of dielectric heating (by apparatus not shown) or may be heated external to the mold of FIG. 2 in a conventional oven (not shown). Sheet 223 may be heated, in addition, as described in aforementioned copending patent applications Ser. No. 07/377,657 or Ser. No. 07/486,491 employing dielectric heating. The sheet 223 comprises fiber material and thermoplastic resin. The fiber material may comprise glass, carbon, ceramic fibers, or mixtures thereof. Any thermoplastic resin, such as those previously listed, or blends thereof, may be used for the sheet 223. During the deformation process, the sheet 223 and layer 222 may be subjected to a pressure of $\frac{1}{2}$ ton/inch$^2$ to 2 tons/inch$^2$ during a typical cycle time of 45/60 seconds.

The sheet 223 is in the molten state or significantly above the glass transition temperature to be sufficiently soft to flow, heat and melt layer 220 and deform to the contour of the layer 220 and surface 214 of the lower core 208 when compressed therebetween. The layer 222 of thermoplastic resin powder is preferably electrostatically deposited on the surface of hard skin layer 220. The layer 222 is unmelted at the temperature of the core 206 which is significantly below the molten temperature of the sheet 223.

In this embodiment, by way of example, the mold cores 206 and 208 are moved toward one another to compress the layer 222 and sheet 223 together. Other molding procedures may be used in the alternative. The hot sheet 223 is compression deformed to the contours of the lower core 208 surface 214 and the surface of hard skin layer 220. When the sheet 223 makes intimate contact with the deposited layer 222 which is not melted, a phenomena occurs due to the presence of the insulation of layer 218. The insulating layer 218 allows the molten plastic of layer 223 to heat the electrostatically deposited layer 222 and the hard skin layer 220. The insulation of layer 218 prevents the heat of the sheet 223 from being immediately conducted away to the cooler core 206 adjacent to the electrostatically deposited resin layer 220. As a result, the thermoplastic layer 222 heats up and melts due to the presence of the heat from the sheet 223 transferring to the layer 222.

As the powder form of the layer 222 heats and melts, it is simultaneously compressed by the pressure of the two mold halves. During the compression, the resin of the layer 222 fills the mold surfaces formed by the hard skin layer 220 resulting in a surface finish defined by layer 220. At the same time, the subsequently softened, melted thermoplastic resin powder formed by layer 222 is in intimate pressurized contact with the sheet 223 which is also in the molten state. The molecules of the heat softened layer 222 and the sheet 223 combine to form an integral structure which is homogeneous at the interface between the layer and the sheet 223.

Figure 4:
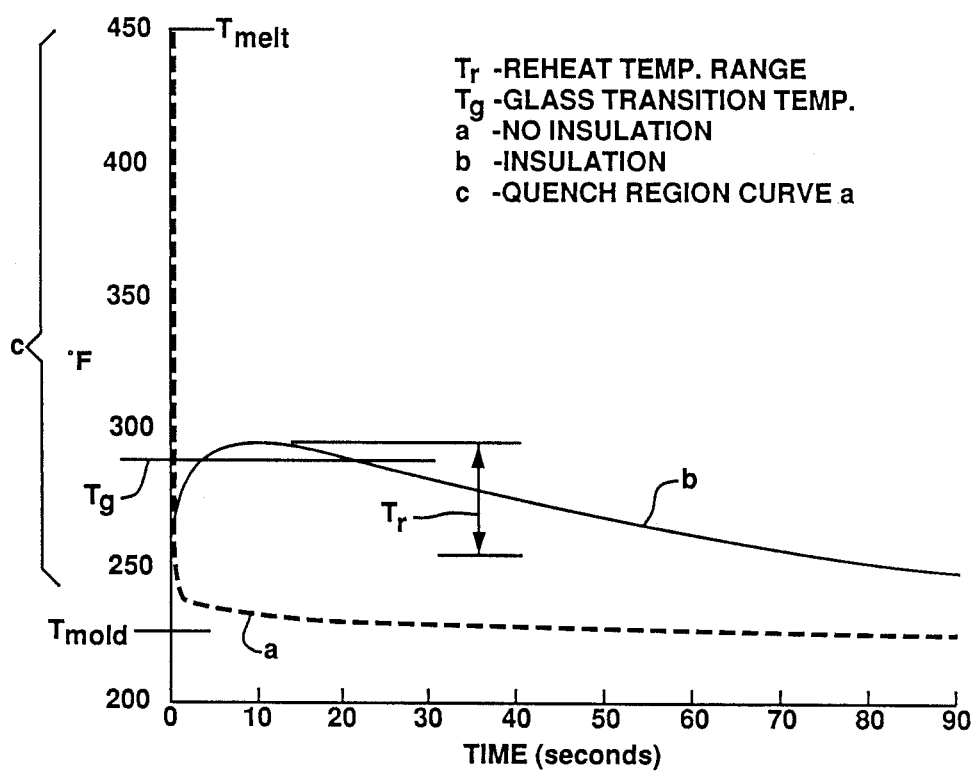
FIG. 4 is graph showing the calculated component outer surface temperature versus time for different kinds of molds including one with an insulation layer and one without an insulation layer.

In FIG. 4, without insulation, the surface temperature of the composite sheet 223 immediately cools down as shown by curve a. The powder layer 222 does not melt and there is poor adhesion between the powder and the composite sheet. Employing the insulated mold illustrated in FIG. 2, the thermoplastic sheet 223 surface is initially quenched by the cooled skin layer 220 and neat resin layer 222, but is subsequently reheated by the hot melt of the sheet 223. Assume a glass transition temperature $T_g$ of the neat resin 222 when an amorphous material is used. The temperature of the layer 222, curve b, rises above the glass transition temperature in a reheat temperature range of $T_r$. This reheat temperature range places the layer 222 at a temperature above a point at which the layer melts causing it to flow and join with the molten sheet 223 at the interface therebetween.

It is important that there be strong adhesion of the resinous layer formed by layer 222 to the bulk composite part formed by sheet 223 and that there is close duplication of the mold surfaces to the resultant deformed component. By applying the molding pressure during the period when the temperature of the layer 222 is above its glass transition temperature $T_g$, the layer 222 flows and produces the desired strong bond with the bulk sheet 223. Thus a good bond and a smooth surface can be produced using heat from the molten plastic sheet 223 without the addition of any supplemental heat. The temperature of the sheet 223, therefore, is important in order to ensure that the temperature of the deposit layer 222 rises above its glass transition temperature melt temperature. In the alternative, the layer 222 may be preheated to further increase its temperature during the molding procedure.

Figure 3:
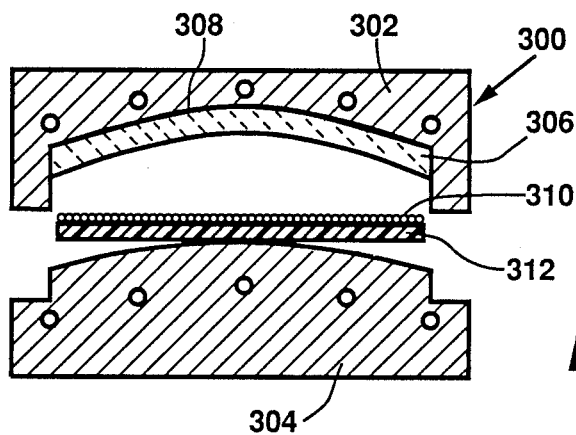
FIG. 3 is a sectional side elevation view of upper and lower mold halves for molding the component of FIG. 1 in accordance with a second embodiment of the present invention.

In FIG. 3, in the alternative, mold 300 comprises an upper core 302 and a lower core 304. An insulating layer 306 is attached to the surface 308 of the upper core 302. It is assumed the insulating layer 306 has a sufficiently hard surface to form the resulting component. The hard skin layer 220, FIG. 2, is not used in the embodiment of FIG. 3. Also, in FIG. 3, by way of example, the resin layer 310 is deposited on composite sheet 312 rather than on the mold surface as is layer 222, FIG. 2. The layer 310 may be deposited by spraying resin particles on top of the sheet or electrostatically depositing powders on the sheet. The layer 310 is unmelted at the time it is deposited on the sheet 312 and is deposited on sheet 312 after the sheet 312 is heated in a conventional oven. In the alternative, the layer 310 may be deposited on the sheet 312 before the sheet is heated in a conventional oven (not shown) or heated by RF dielectric means (not shown) in FIG. 3.

In the embodiment of FIG. 3, the deposited layer 310 is not heated and the sheet 312 is preheated. When the cores 302 and 304 close, they compression form the sheet 312 and the deposited layer 310 into the shape of the component 10, FIG. 1. The heat from the composite sheet 312 flows to its surface adjacent to the insulating layer 306, heats and melts the layer 310 as shown by the graph of FIG. 4 and discussed above in connection with FIG. 2.

Figure 5:
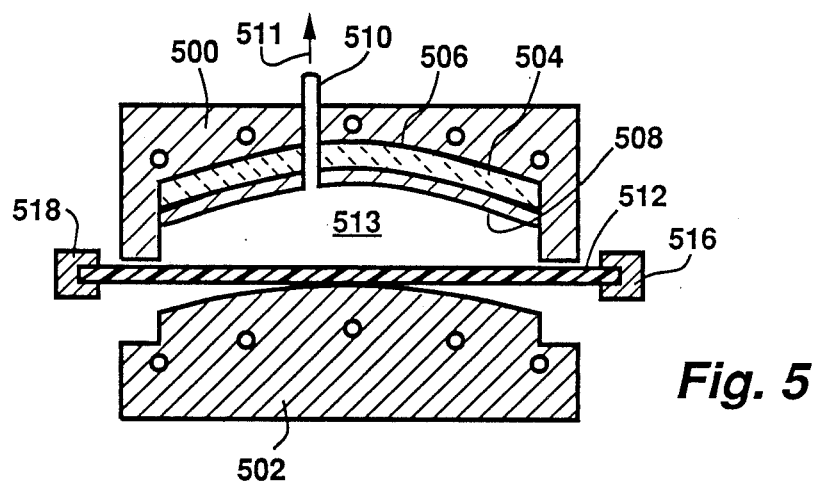
FIG. 5 is a sectional elevation view of a mold for producing a resin rich layer for forming the component of FIG. 1 in accordance with a third embodiment.

In FIG. 5, in the alternative, an upper core 500 mates with a lower core 502. An insulating layer 504 is attached to the surface 506 of core 500. A hard skin layer 508 is attached to the insulating layer 504. The structure of the core 500, the insulating layer 504 and hard skin layer 508 are similar to that discussed above in connection with the embodiment of FIG. 2. In addition, a vacuum conduit 510 is coupled to the interior 513 of the mold between cores 502 and 500. A thin thermoplastic sheet 512 comprising a neat resin of a material that is compatible with the body of the sheet 512 forming the component 10, FIG. 1, is placed between the cores 500 and 502. A pair of clamps 516 and 518 hold the sheet 512 in the space 513 between the mold halves formed by cores 500 and 502.

Figure 6:
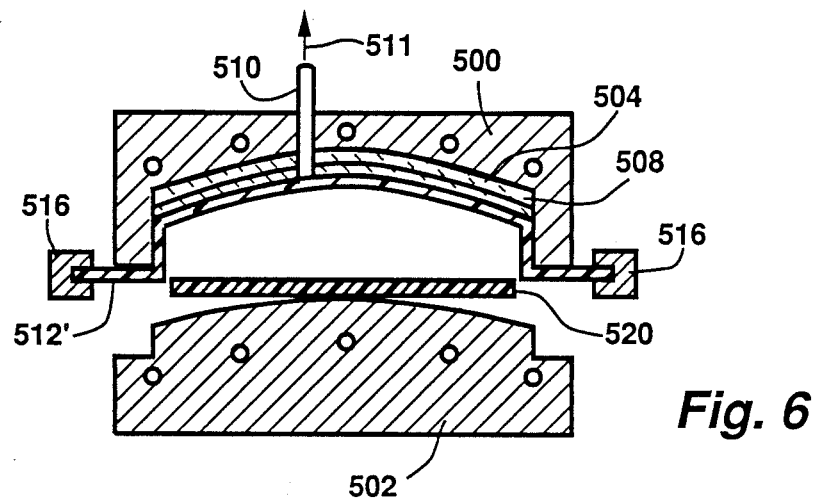
FIG. 6 is a later step in a sequence of the method for producing the component of FIG. 1 employing the layer of FIG. 5.

Sheet 512 is placed adjacent to the upper mold 500 so that the vacuum imposed on conduit 510 causes the sheet 512 to be pressed against the upper core and layer 508 in the direction 511 and deform as shown in FIG. 6, forming component 512'. The sheet 512 is preheated in a conventional oven and vacuum formed using a conventional vacuum forming technique. The sheet 512 may be several mils thick (thousandths of an inch).

After the sheet 512' is deformed, FIG. 6, a sheet 520 of a thermoplastic composite material comprising a resin compatible with the resin of sheet 512', is placed between the mold halves. The sheet 520 is preheated to above its transition temperature or otherwise melted. The sheet 512' meanwhile, in the condition shown in FIG. 6, is below its transition temperature and is sufficiently cool that it is not capable of flowing to form a bond with the sheet 520. The mold cores 500 and 502 are then closed to compression deform the sheet 520 against the sheet 512'. The heat from sheet 520 flows towards sheet 512' melting it to a point above its melting point or heating it above its transition temperature such that the sheet 512' flows and forms a molecular bond with the molten sheet 520 at the interface therebetween to form an integral structural homogeneous bond at the joint therebetween. Sheet 512' may be thus bonded to the composite sheet 520 as a preform. In a still different alternative embodiment, the sheet such as sheet 512' may be bonded to the composite sheet 520 as a thin film and need not be formed as a preform as shown in FIG. 6. The sheet 512' may contain fillers, pigments, and other materials that are desired for the surface of the composite component. In any case, the interface between the resin layer formed by the sheet 512' and the bulk of composite sheet 520 forms a strong structural bond therebetween.

In a preliminary experiment, a resin rich layer was formed on a surface of a composite sheet made of XENOY, a trademark of the General Electric Company, comprising a blend of polycarbonate and polybutylene terephthalate containing 30% glass fibers by weight. A 1/16 inch thin copper clad insulator normally used in printed circuit board manufacture was employed as insulation layer 218 and hard skin layer 220. A layer of resin material was deposited over the copper portion of the copper clad insulator. The resin materials employed in the different following examples included powders of LEXAN, a trademark of the General Electric Company, comprising a polycarbonate thermoplastic material and films of XENOY material, forming the resin rich layer 222, FIG. 2. A ⅛ inch thick composite sheet of XENOY was heated in an oven until its temperature in the central region between its broad surfaces was at about 550° F. The heated sheet was then placed on the deposited resin layer covering the copper clad insulator. The insulator, resin layer, and composite sheet were then pressed with an approximate pressure of 0.4 ton/inch$^2$ in a Wabash press. The temperature of the mold platens was maintained at 225° F. Powders of LEXAN material sprayed on the copper layer of the printed circuit board were completely melted after compression. A resin rich layer was produced on the surface of the composite layer and this layer closely duplicated the surface of the insulator. Excellent bonding of the resinous skin layer to the bulk composite layer was observed. The same material, which was placed on a mold metal platen without an insulator, produced a part covered with unmelted white LEXAN powders.

In a second example, powders of polycarbonate cyclics were sprayed on the insulator layer and were observed to be completely melted after molding. In a third example, polycarbonate cyclic powders were deposited on an uninsulated mold layer and compressed with a hot sheet bulk composite layer. The surface of the bulk composite sheet layer after molding was partially covered with melted powders.

In a fourth example, a ⅛ inch sheet of composite XENOY containing 30% glass fibers was compression bonded with a thin XENOY film employing a mold having an insulated surface layer. The resulting product had a resin rich skin layer in the position of the thin XENOY film, with a strong structural bond between the film and the composite sheet. A peel-off test showed that the bond between the XENOY film and the composite sheet did not appear to be as strong as the bond produced by the melted powder LEXAN material. In a fifth example, a metal platen was used in place of a insulated layer in the upper mold half. The surface of the XENOY film laminated to the composite bulk sheet, however, the film layer had poor adhesion to the bulk composite sheet.

What is claimed is:

1. A method of making a fiber reinforced composite component having a resin rich layer at a component surface comprising:
    forming a fiber free layer of a first thermoplastic resin below the molten temperature of the first resin;
    heating a composite bulk layer comprising a second thermoplastic resin and reinforcing fibers until the second thermoplastic resin is molten, said first and second resins comprising compatible resins; and
    compressing the first resin layer and bulk layer together, said first resin layer compressed by an insulated portion of a mold, so that the heat of the bulk layer heats the fiber free layer until it is molten, while the layers are being compressed.

2. The method of claim 1 wherein said step of forming the fiber free layer includes electrostatically depositing the fiber free layer in powder form on the insulated portion of the mold.

3. The method of claim 1 wherein said step of forming said fiber free layer includes forming a sheet of said first thermoplastic resin and placing the sheet adjacent to the insulated portion of the mold.

4. The method of claim 1 wherein said step of forming said fiber free layer includes depositing said first resin on at least a portion of said molten bulk layer.

5. The method of claim 1 wherein said heating step includes first heating the bulk layer and then placing the heated bulk layer in a mold.

6. The method of claim 1 wherein said heating step includes first placing the bulk layer in a mold and then heating the bulk layer.

7. The method of claim 1 wherein said heating step includes dielectric heating of the bulk layer.

8. The method of claim 1 wherein forming the fiber free layer includes electrostatically depositing the fiber free layer in powder form on the heated bulk layer.

9. The method of claim 1 wherein said step of forming said resin free layer includes forming a sheet of said first fiber layer and placing the sheet on said heated bulk layer.

10. The method of claim 1 wherein said first and second resins comprise the same resin.

11. A method of making a fiber reinforced component having a resin rich layer at a component surface comprising:
    forming a fiber free first thermoplastic resin layer below the molten temperature of the first resin;
    heating a composite bulk layer comprising a second thermoplastic resin and reinforcing fibers until the second resin is molten, said first and second resins comprising compatible resins;
    compressing the first resin layer and bulk layer together, said first resin layer thermally insulated from the mold during compression so that the heat from the bulk layer melts the first resin layer; and
    cooling said fiber free resin layer and bulk layer to form an integral structure.

12. The method of claim 11, wherein said heating step includes first heating the bulk layer and then placing the heated bulk layer in the mold.

13. The method of claim 11 wherein said heating step includes first placing the bulk layer in the mold and then heating the bulk layer.

14. The method of claim 11, wherein said heating step includes dielectric heating of the bulk layer.

15. The method of claim 11 wherein said forming step includes electrostatically depositing the fiber free layer in powder form on the heated bulk layer.

16. The method of claim 11 wherein said step of forming said fiber free layer includes depositing said fiber free layer on at least a portion of said molten bulk layer.

* * * * *